United States Patent [19]
Lee

[11] Patent Number: 6,091,675
[45] Date of Patent: Jul. 18, 2000

[54] INTEGRATED CD-ROM DRIVING APPARATUS FOR DRIVING DIFFERENT TYPES OF CD-ROMS IN MULTIMEDIA COMPUTER SYSTEMS

[75] Inventor: Jae-Soon Lee, Suwon, Rep. of Korea

[73] Assignee: SamSung Electronics Co., Ltd., Suwon, Rep. of Korea

[21] Appl. No.: 08/891,989

[22] Filed: Jul. 14, 1997

[30] Foreign Application Priority Data

Jul. 13, 1996 [KR] Rep. of Korea ................. 96/28423

[51] Int. Cl.[7] ........................................ G11B 17/22
[52] U.S. Cl. ........................................... 369/33
[58] Field of Search ........................ 369/33, 32, 58, 369/48, 47; 386/125, 126

[56] References Cited

U.S. PATENT DOCUMENTS

| | | | |
|---|---|---|---|
| 4,893,193 | 1/1990 | Nakamura et al. | 369/32 |
| 5,309,249 | 5/1994 | Ishii . | |
| 5,448,700 | 9/1995 | Kim . | |
| 5,457,668 | 10/1995 | Hibino et al. | 369/32 |
| 5,463,601 | 10/1995 | Yanagisawa | 369/32 |
| 5,524,104 | 6/1996 | Iwata et al. . | |
| 5,548,777 | 8/1996 | Woo . | |
| 5,557,590 | 9/1996 | Matsumoto et al. | 369/30 |
| 5,592,640 | 1/1997 | Minoura et al. . | |
| 5,619,731 | 4/1997 | Jenkins et al. | 369/32 |

*Primary Examiner*—Tan Dinh
*Attorney, Agent, or Firm*—Robert E. Bushnell, Esq.

[57] ABSTRACT

A control apparatus for driving different types of CD-ROMs includes a control panel provided at the front panel of the computer frame. The control panel has a plurality of keys and a display window for outputting key signals representative of driving a specific CD-ROM title and the operation of the CD-ROM drive, and for displaying a message representing the kind of CD-ROM and icons representing the functions of the respective keys. A micro-controller cooperates with the control panel and the central processing unit (CPU) of the computer system for displaying the icons and the kind of CD-ROM on the display window, and in response to a key signal produces preset command signals for driving the CD-ROM title and the operation of the CD-ROM drive. The control panel of the invention simplifies the driving operations of various CD-ROMs, which results in easy access to the multimedia computer for beginners.

20 Claims, 4 Drawing Sheets

INTEGRATED CD-ROM DRIVING APPARATUS FOR DRIVING DIFFERENT TYPES OF CD-ROMS IN MULTIMEDIA COMPUTER SYSTEMS

CLAIM OF PRIORITY

This application makes reference to, incorporates the same herein, and claims all benefits accruing under 35 U.S.C. §119 from an application for INTEGRATED CD-ROM DRIVING APPARATUS AND METHOD FOR CONTROLLING THE SAME earlier filed in the Korean Industrial Property Office on the 13$^{th}$ day of July 1996 and there duly assigned Ser. No. 28423/1996, a copy of which application is annexed hereto.

BACKGROUND OF THE INVENTION

1. Field of the Invention

The present invention relates to a control apparatus of the CD-ROM drive, and more particularly, relates to a control apparatus for driving different types of CD-ROMs in a CD-ROM drive for use in multimedia computer systems.

2. Related Art

In recent years personal computer systems have become more and more high-speed and powerful. Personal computer systems can process a variety of information data such as text, sounds, graphics, animation, movie, and so forth in a multimedia environment. All information data including text, sounds, graphics, animation, and movies are now available in a CD-ROM (which is a non-magnetic disk) which has a much larger storage capacity than other conventional magnetic recording media. Contemporary applications of CD-ROMs may be disclosed, for example, in U.S. Pat. No. 5,309,249 for Optical Disc Reproducing Apparatus Having Displayed Mode Control Key Functions Which Are Controlled By Detection Of The Type Of Disc Being Reproduced issued to Ishii, U.S. Pat. No. 5,448,700 for Method And System For Interfacing PC To CD-ROM Drives issued to Kim, and U.S. Pat. No. 5,548,777 for Interface Control System For A CD-ROM Driver By Memory Mapped I/O Method Having A Predetermined Base Address Using An ISA Bus Standard issued to Woo.

Conventional CD-ROMs for multimedia computer systems are presently classified in different types, such as an audio CD, a video CD, a photo CD, and CD plus. For example, in U.S. Pat. No. 5,592,640 for Data Processing Apparatus Capable Of Reading Data From Different-Format CD-ROMs According To Different Processing Methods Of The Data, Minoura et al., disclose a CD-ROM drive for driving both normal audio CD-ROM format and CD-ROM extended architecture format disks. A CD-ROM drive which is necessary for operation of CD-ROMs, must be configured to read all types of CD-ROMs. However, in order to play each type of CD-ROM except the audio CD, the computer systems must require adaptable specific software drivers.

Generally, when driving a CD-ROM title, for example, a video CD in the computer system, a corresponding software driver must be executed after an operating system is executed. Then other operations such as selecting an icon provided within the software by a mouse or a command through a keyboard is required to perform a desired function. Such operations can be performed by pressing function keys of a remote controller, if available. While software driver can be constructed to accommodate different types of CD-ROM drives, access to the program and execution thereof must be carried out by using a mouse or keyboard. Thus, selecting a specific software driver for driving a CD-ROM title can be tricky and troublesome, and operation of each software driver is difficult for beginners or many novice users of multimedia computer systems since the function keys used in the drivers are different from each other.

SUMMARY OF THE INVENTION

Accordingly, it is therefore an object of the present invention to provide a control apparatus for CD-ROMs.

It is also an object to provide a control apparatus for efficiently and effectively driving a variety of different types of CD-ROMs in multimedia computer systems.

These and other objects of the present invention can be achieved by a control apparatus for driving various types of CD-ROMs according to the present invention which includes a control panel provided on a front panel of a computer system having a plurality of input keys and a display window, for outputting key signals representative of driving of a specific CD-ROM title and the operation of the CD-ROM drive, and for displaying a message indicating the specific type of the CD-ROMs and icons indicating functions of the respective input key. A micro-controller which cooperates with the control panel and a central processing unit of the computer system displays the icons and the specific type of the CD-ROMs on the display window, and drive the CD-ROM title and the operation of the CD-ROM drive in response to the key signals. The central processing unit is connected to the micro-controller to execute an adaptable software driver and operate the CD-ROM drive to perform a desired function in response to a preset command signal fed from the micro-controller.

The input keys provided in the control panel are preferably a push button switches and are designated by a series of numbers and connected to input terminals of the micro-controller by the respective signal lines. The display window is preferably a liquid crystal display (LCD) panel for providing a visual display of icons corresponding to the input keys which represent preset functions or operation designated by the respective key. In addition, the input keys designated for driving a CD-ROM title correspond to a plurality of sub-icons for available control functions re-allocated to the keys when one of the CD-ROM driving keys is selected.

According to the present invention, a process of controlling a CD-ROM drive for driving different types of CD-ROMs can be achieved by the steps of displaying icons for driving a CD-ROM title on a display panel; inserting a CD-ROM into the CD-ROM drive; displaying a message indicating a specific type of CD-ROM inserted in the CD-ROM drive; determining whether an input key designated for driving the specific type of CD-ROM is selected by a user; and displaying sub-icons onto the display panel indicating available control functions designated to each input key when one of CD-ROM driving input keys is selected by the user. A micro-controller is incorporated into a main board of the computer system and cooperates with a central processing unit (CPU). Control panel displays the type of CD-ROM title detected by the computer system. By selectively pressing the buttons in the control panel, desired operation of the CD-ROM drive and the software driver are possible.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
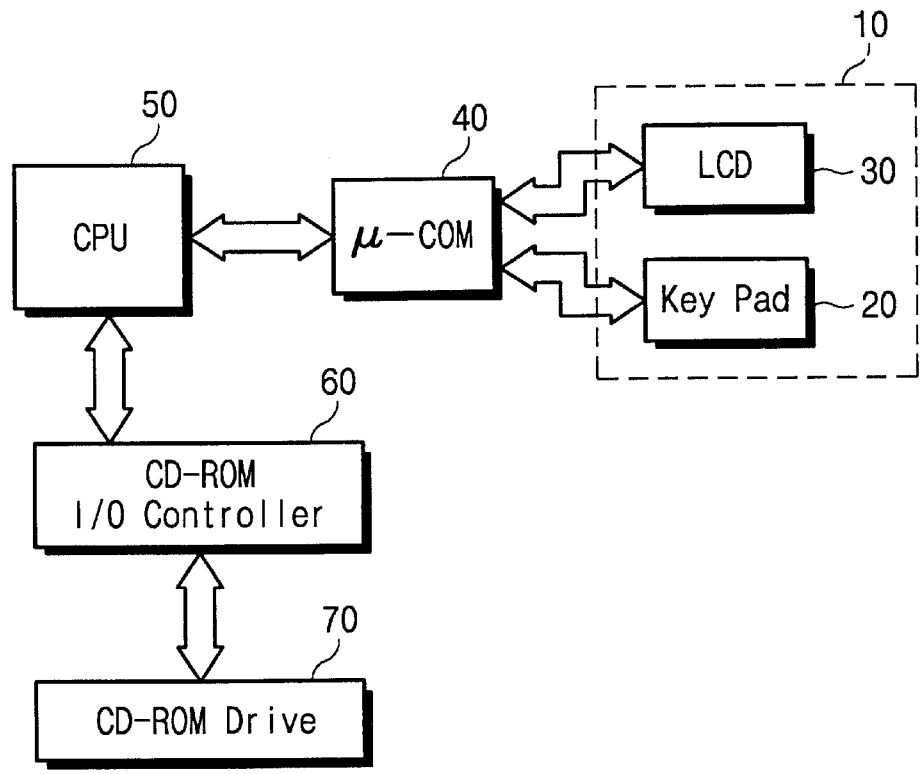
FIG. 1 is a system configuration of an integrated CD-ROM control apparatus constructed according to the principles of the present invention.

FIG. 1 illustrates a control system for driving various types of CD-ROMs in a CD-ROM drive constructed according to the principles of the present invention. The control system comprises a control panel 10, a micro-computer 40, a central processing unit (CPU) 50, a CD-ROM input/output (I/O) controller 60 and a CD-ROM drive 70.

The control panel 10 is preferably provided at the front panel of a computer frame, and includes a keypad 20 having a plurality of input keys and a display window in the form of a liquid crystal display (LCD) 30. The micro-controller 40 cooperates with the control panel 10 and the central processing unit (CPU) 50 of the computer system. Preferably, the micro-controller 40 consists of a one-chip micro-computer and is mounted in the main board of the computer system. A CD-ROM drive 70 is coupled to the CPU 50 through a CD-ROM I/O controller 60.

Figure 2:
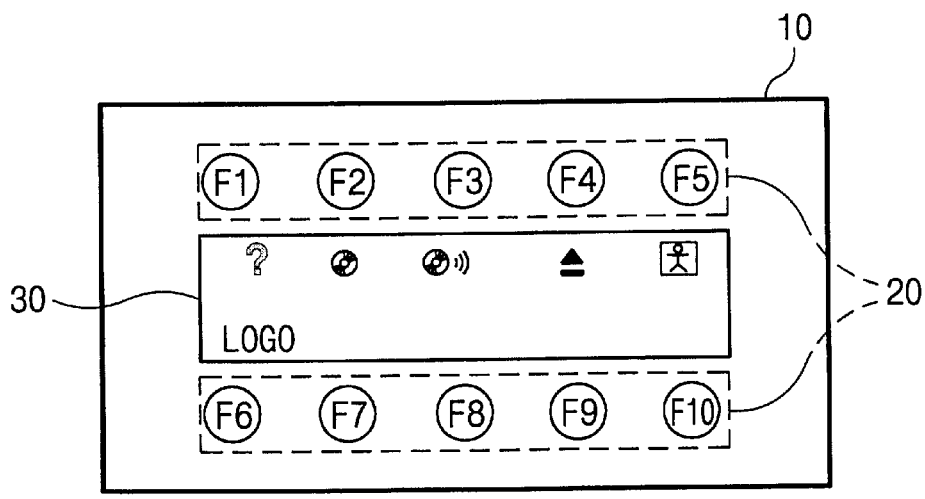
FIG. 2 illustrates the front of the control panel having a LCD display panel and a plurality of buttons.

FIG. 2 illustrates the detail of the control panel 10. For example, the LCD panel 30 is located at the center portion of the control panel 10 and the keys of the keypad 20 are arranged at upper side and lower side of the rectangular LCD panel 30. The keys 20 are designated by a series of numbers such as function keys of a computer keyboard (e.g., F1~F10). Each key is connected to input terminals of the micro-controller 40 by the respective signal line. The LCD panel 30 displays icons adjacent to each key 20. Each icon a represents preset function or operation designated by the respective key 20. Further, the LCD panel 30 displays the information related to the type of CD-ROM title inserted in the CD-ROM drive 70. For example, F1 key is designated to call help information related to operation of the control panel 10, and facing the F1 key, the question mark is allocated. Similarly, for the F2 and F3 keys, CD icons are allocated to drive a video CD and an audio CD, respectively. In addition, for the F4 key, an icon is allocated to open/close the tray of the CD-ROM drive 70.

Further, as for the F2 and F3 keys for driving a CD-ROM title, they have a plurality of sub-icons allocated to the keys F1~F10 when the F2 or F3 key is pressed. Each sub-icon represents the available control function such as play/pause, stop, one track skip back and forward, volume up/down, and return to main menus, etc.

Graphic data of the icons or sub-icons are supplied with the LCD panel 30 when the computer system is started. Also, the CD-ROM information detected by the CPU 50 through the CD-ROM I/O controller 60 is supplied by the micro-controller 40 to display the type of the CD-ROM title onto the LCD panel 30. By pressing one key 20 designated by F1~F10, the corresponding key signal is applied to the microcontroller 40. Responsive thereto, the microcontroller 40 generates a preset control signal supplied to the CPU 50. In response to the control signals fed from the microcontroller 40, the CPU 50 produces a command for executing a software driver adaptable to the CD-ROM title or for controlling the operation of the CD-ROM drive 70 through the I/O controller 60.

The operation of the microcontroller 40 will now be described with reference to FIGS. 3 and 4 hereinbelow.

Figure 3:
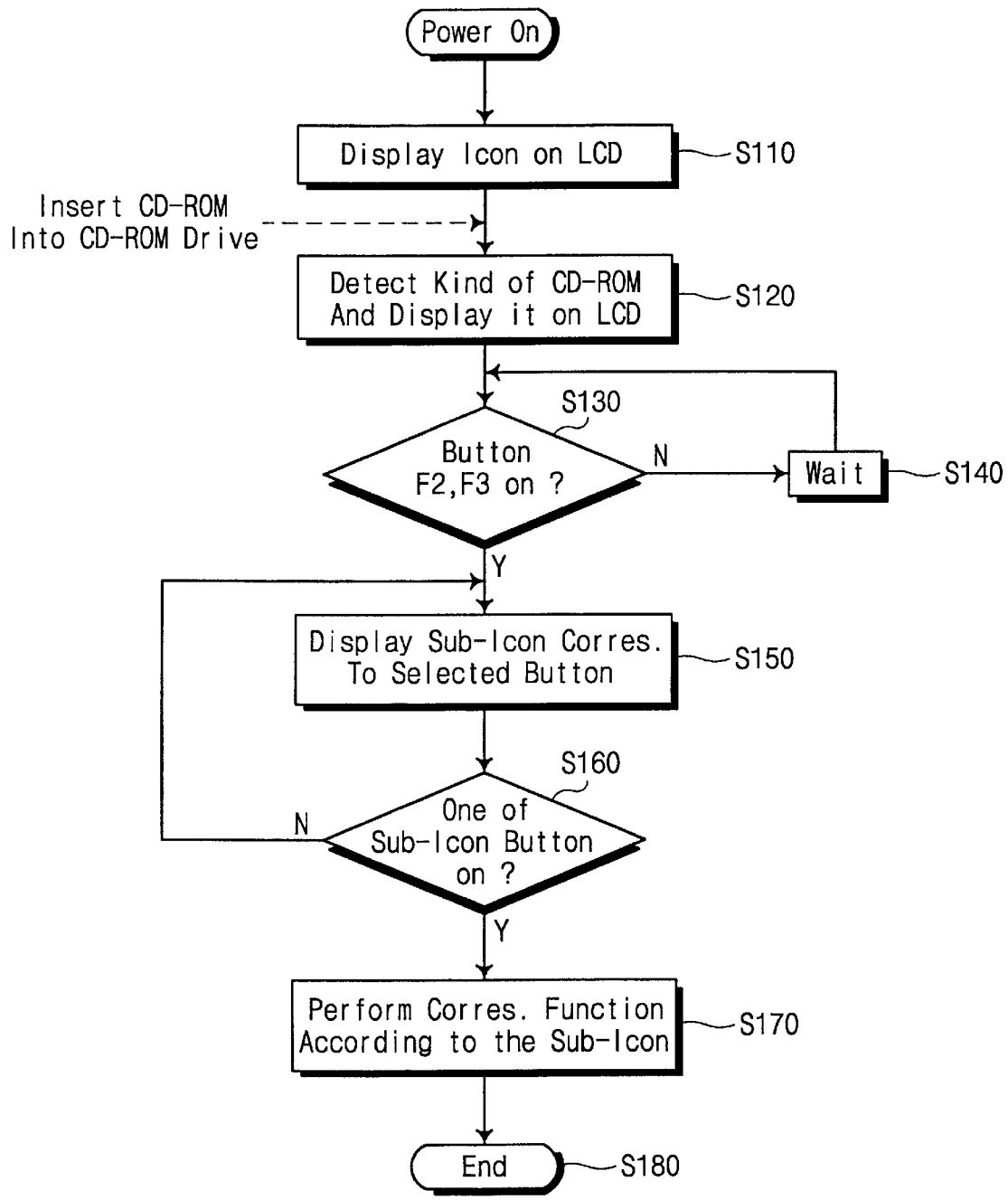
FIG. 3 is a flowchart of a control process carried out in the microcontroller according to the present invention.
Figure 4:
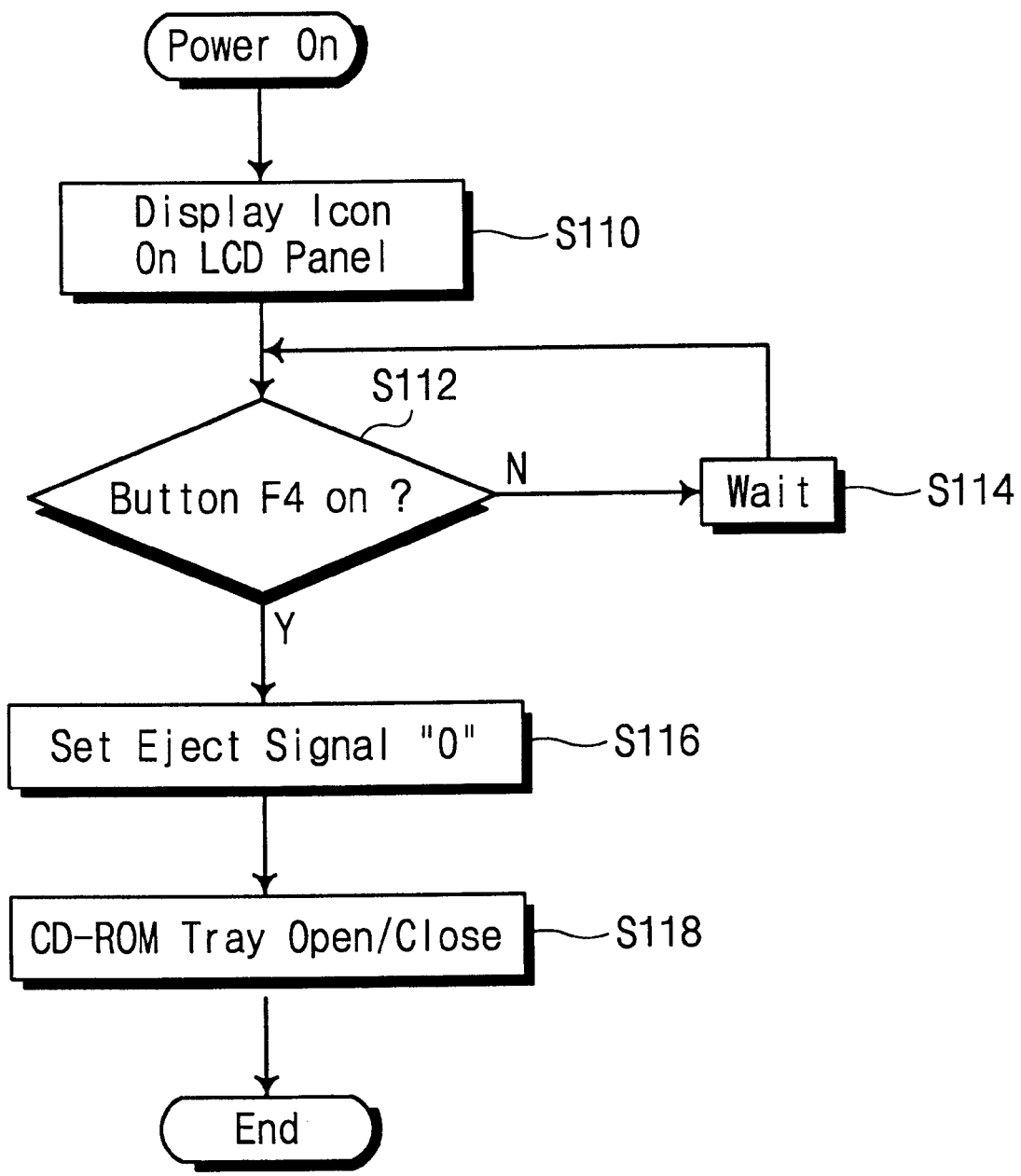
FIG. 4 is a flowchart of the method of controlling the tray open/close operation.
Figure 5A:
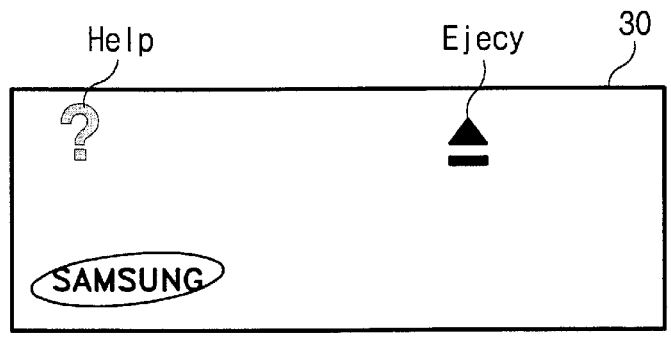
FIGS. 5A–5C are examples of icon arrangements displayed on the LCD display panel in accordance with the controlling method of FIG. 3.
Figure 5B:
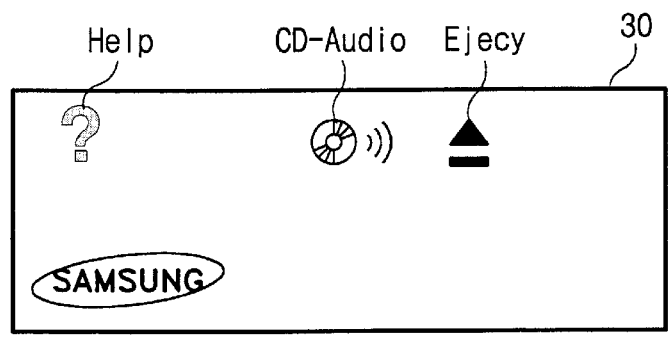

FIG. 3 illustrates a control operation of the microcontroller 40 for driving a CD-ROM title. Before inserting a CD-ROM title into the CD-ROM drive 70, the icons for a plurality of keys 20 are displayed onto the LCD panel 30 of the control panel 10 when the computer system is powered on and system initialization is finished at step 110. Icons may be displayed on the LCD panel 30 as shown, for example, in FIG. 5A. The type of CD-ROM is detected by the CPU 50 and its signal is transferred to the microcontroller 40 to generate corresponding character information (e.g., audio CD) and the message is displayed onto the LCD panel 30 at step 120. For example, in case that the type of CD-ROM inserted into the CD-ROM drive 70 is an audio CD title, the icons for a plurality of keys are displayed on the LCD panel 30, as shown in FIG. 5B.

Figure 5C:
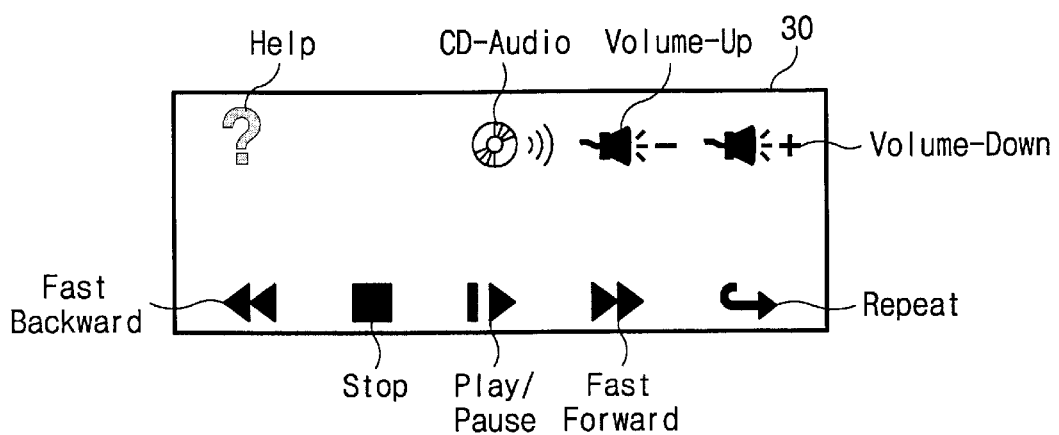

Next, at step 130, the micro-controller 40 determines whether button F2 or F3 corresponding to the CD-ROM title is pressed by the user. If the button input from keypad 20 of control panel 10 does not correspond to the detected CD-ROM, the micro-controller 40 goes to a wait state until the right button is pressed at step 140. If the right button is pressed, the corresponding sub-icons representing the available functions are displayed onto the LCD panel 30 at step 150. For example, if a user selects the audio CD title, a sub-menu containing sub-icons corresponding to selected button indicating an audio CD title may be displayed on the LCD panel 30, as shown in FIG. 5C.

Then, the micro-controller 140 determines whether one of the sub-icon buttons is selected by the user at step 160. For example, if a "play" button is pressed, the micro-controller 40 produces preset command signals to be supplied to the CPU 50. Then the CPU 50 generates preset commands for executing the corresponding software driver and playing the CD-ROM title at step 170. If there is no sub-icon button selected at step 160, the micro-controller 140 returns to step S150 to display sub-icons corresponding to selected button until one of the sub-icon buttons is selected.

Separately, the control method for the tray open/close operation will now be described with reference to FIG. 4. After the computer system is powered on, the icons for a plurality of keys 20 or menus are also displayed onto the LCD panel 30 at step 110. Next, the micro-controller 40 determines whether the tray open/close button (F4) is selected. If the tray open/close button (F4) is not selected, the micro-controller 40 goes to a wait state at step 114. If the tray open/close button (F4) is selected, a command signal is produced to open the tray of the CD-ROM drive 70 if the CD-ROM drive 70 is in a closed state, and vice versa. This signal is supplied to the CPU 50 to generate a command for opening or closing the tray of the CD-ROM drive 70. The operation is carried out by setting the eject signal line led to the I/O controller 60 to a logical "0" state at step 116. Responsive to the command signal, the tray open or close operation is performed at step 118.

As apparent from foregoing, the CD-ROM control is apparatus of the present invention provides an integrated control approach for driving different types of CD-ROMs in a CD-ROM drive. In particular, the control panel of the invention simplifies the driving operations of different types of CD-ROMs, which results in easy access to the multimedia computers for novice users.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A control apparatus for controlling a CD-ROM drive of a computer system to drive different types of CD-ROMs, comprising:

a control panel having a plurality of input keys and a display window, outputting key signals designating specific CD-ROM titles and the operation of the CD-ROM drive, and displaying a message indicating the CD-ROMs by type and icons distinguishing between functions of different corresponding ones of said input keys, said control panel displaying said message on said display window and positioning said input keys in a first spaced array within an area located outside of said display window that extends continuously along a periphery of said display window, with said control panel panel selectively presenting said icons in a second spaced array located within said display window and extending continuously along said periphery with a spacial alignment between each of said input keys and corresponding ones of said icons;

a controller operationally cooperating with said control panel and a central processing unit of the computer system, by driving said control panel to initiate said displaying of said icons and said type of the CD-ROMs on said display window, and reading the CD-ROM titles in response to said key signals; and said central processing unit of the computer system executing an adaptable software driver and operating the CD-ROM drive to perform different operational functions in response to corresponding preset command signals received from said controller.

2. The control apparatus of claim 1, further comprised of said control panel being disposed on a front panel of said computer system.

3. The control apparatus of claim 1, further comprised of said input keys corresponding to push button switches and said display window corresponding to a liquid crystal display panel.

4. The control apparatus of claim 3, further comprised of said input keys being designated by a series of numbers and connected to the micro-controller by respective signal lines, and said liquid crystal display panel respectively providing a visual display of icons adjacent to each input key, each icon representing a preset function or operation designated by the respective input key.

5. The control apparatus of claim 1, further comprised of said input keys designated for driving a CD-ROM title corresponding to a plurality of sub-icons respectively re-allocated to the input keys when one of the CD-ROM driving keys is selected, the sub-icons representing the available control functions designated by the respective input keys.

6. The control apparatus of claim 4, further comprised of said input keys designated for driving a CD-ROM title corresponding a plurality of sub-icons respectively re-allocated to the input keys when one of the CD-ROM driving keys is selected, the sub-icons representing the available control functions designated by the respective input keys.

7. The control apparatus of claim 1, further comprised of said controller comprising a one-chip microcomputer disposed on a main board of the computer system.

8. A method of controlling a CD-ROM drive of a computer system to drive different types of CD-ROMs, said method comprising the steps of:

providing a display panel and a plurality of input keys disposed adjacent to said display panel in a control panel;

displaying icons designating CD-ROM titles on said display panel, each icon being disposed adjacent to different corresponding ones of said input keys;

inserting a CD-ROM into the CD-ROM drive;

displaying a message indicating CD-ROM by type inserted in the CD-ROM drive, said message disposed adjacent to said corresponding one of said input keys;

determining whether said input key designated for driving the specific type of CD-ROM is selected by a user; and respectively displaying sub-icons on the display panel, said sub-icons disposed adjacent to said corresponding ones of input keys, said icons indicating available control functions designated by each respective input key when one of CD-ROM driving input keys is selected by the user.

9. The method of claim 8, further comprising the steps of:

determining whether an input key designated for tray open/close operation of the CD-ROM drive is selected before displaying a message indicating the type of CD-ROM; and outputting a command signal for opening/closing the tray of the CD-ROM drive when the tray open/close key is selected by the user.

10. A control apparatus for controlling a CD-ROM drive of a computer system to drive different types of CD-ROMs in the computer system, comprising:

a computer frame;

a control panel having a key unit including a plurality of discrete input keys and a display unit disposed adjacent to said key unit and mounted on a front panel of said computer frame, said display unit providing a visual display indicating CD-ROM by type inserted into the CD-ROM drive and visible icons distinguishing between functions of different corresponding ones of said input keys according to CD-ROM title inserted into the CD-ROM drive, said control panel disposing said input keys in a first spaced array along a periphery of said display window, with said control panel presenting said icons in a second spaced array along said periphery with a spacial alignment between each of said input keys and corresponding ones of said icons;

a first controller electrically connected to the control panel, controlling the visual display of CD-ROM by type inserted into the CD-ROM drive, displaying said visible icons indicating the specific function of the CD-ROM drive requested by the user; and a second controller electrically connected to a microcontroller and the CD-ROM drive, executing an adaptable software driver to operate the CD-ROM drive to perform the specific function of the CD-ROM drive requested by the user.

11. The control apparatus of claim 10, further comprised said input keys corresponding to push button switches and said display unit corresponding to a liquid crystal display panel.

12. The control apparatus of claim 10, further comprised of said input keys being designated by a series of numbers and connected to the controller by respective signal lines, and said liquid crystal display panel respectively providing a visual display of icons adjacent to each input key, each icon representing a preset function or operation designated by the respective input key.

13. The control apparatus of claim 10, further comprised of said first controller comprising a one-chip microcomputer disposed on a main board of the computer system.

14. The control apparatus of claim 10, further comprised of said second controller comprising a central processing unit disposed on a main board of the computer system.

15. A control apparatus for controlling a CD-ROM drive of a computer system to drive different types of CD-ROMs, comprising:

a control panel having a plurality of input keys and a display window, outputting key signals designating specific CD-ROM titles and the operation of the CD-ROM drive, and displaying a message indicating the CD-ROMs by type and icons distinguishing between functions of different corresponding ones of said input keys, said control panel displaying each icon and said message disposed adjacent to said corresponding ones of said input keys;

a controller operationally cooperating with said control panel and a central processing unit of the computer system, displaying said icons and said type of the CD-ROMs on said display window, and reading the CD-ROM titles and the operation of the CD-ROM drive in response to the key signals; and said central processing unit of the computer system executing an adaptable software driver and operating the CD-ROM drive to perform desired function in response to corresponding preset command signals received from said controller.

16. A control apparatus for controlling a disk drive of a computer system to drive different types of disks, comprising:

a controller connected to said disk drive, generating a message signal indicating disk by types and icon signals each indicating an individual function of said disk drive; and a control panel connected to said controller, including a plurality of input keys and a display window disposed adjacent to said input keys, displaying on said display window a message indicating a disk by type in response to said message signal and icons distinguishing between functions of different corresponding ones of said input keys in response to said icon signal, said control panel disposing said input keys in a first spaced array along a periphery of said display window, with said control panel presenting said icons in a second spaced array along said periphery with a spacial alignment between each of said input keys and corresponding ones of said icons.

17. The control apparatus of claim 16, further comprised of:

said control panel generating a key signal in accordance with the selection of one of said input keys; and said controller connected to said control panel, driving said disk drive in response to said key signal and said icon disposed adjacent to said input key.

18. The control apparatus of claim 16, further comprised of said control panel displaying on said display window a message in response to said message signal, said messages disposed adjacent one of said input keys, generating a key signal in accordance with the selection of said input key disposed adjacent to said message.

19. The control apparatus of claim 18, further comprised of said controller connected to said control panel, generating said icon signals in response to said key signal.

20. The control apparatus of claim 19, further comprised of each one of said input keys designated to either one of said message or a respective one of said icons.

* * * * *